United States Patent
O'Brien et al.

(10) Patent No.: US 9,447,764 B2
(45) Date of Patent: Sep. 20, 2016

(54) INTERNAL COMBUSTION ENGINE START-STOP CONTROLS

(71) Applicant: Cummins Inc., Columbus, IN (US)

(72) Inventors: John P. O'Brien, Columbus, IN (US); Thomas W. Elliott, Huddersfield (GB); Joseph Lisano, Columbus, IN (US)

(73) Assignee: Cummins Inc., Columbus, IN (US)

( * ) Notice: Subject to any disclaimer, the term of this patent is extended or adjusted under 35 U.S.C. 154(b) by 200 days.

(21) Appl. No.: 14/328,088

(22) Filed: Jul. 10, 2014

(65) Prior Publication Data

US 2016/0010613 A1   Jan. 14, 2016

(51) Int. Cl.
| | |
|---|---|
| *F02N 11/08* | (2006.01) |
| *F01P 3/00* | (2006.01) |
| *F02B 39/16* | (2006.01) |
| *F02N 11/10* | (2006.01) |

(52) U.S. Cl.
CPC ............. *F02N 11/0818* (2013.01); *F01P 3/00* (2013.01); *F02B 39/16* (2013.01); *F02N 11/10* (2013.01); *F02B 2039/164* (2013.01); *F02N 2200/023* (2013.01); *F02N 2300/2006* (2013.01); *F02N 2300/2008* (2013.01)

(58) Field of Classification Search
CPC ............... F02N 11/0818; F02N 11/10; F02N 2200/023; F02N 2300/2008; F02B 39/16; F02B 2039/164
See application file for complete search history.

(56) References Cited

U.S. PATENT DOCUMENTS

| | | | |
|---|---|---|---|
| 6,622,804 B2 | 9/2003 | Schmitz et al. | |
| 6,658,345 B2* | 12/2003 | Miller ................ | F02D 41/2474 123/41.31 |
| 7,017,542 B2 | 3/2006 | Wilton et al. | |
| 8,015,810 B2 | 9/2011 | Theobald | |
| 8,585,548 B2 | 11/2013 | Zhang et al. | |
| 2002/0028726 A1 | 3/2002 | Morimoto et al. | |
| 2009/0133946 A1 | 5/2009 | Pels et al. | |
| 2012/0089317 A1 | 4/2012 | Herbolzheimer | |
| 2012/0123666 A1 | 5/2012 | Stoffels et al. | |
| 2013/0074795 A1 | 3/2013 | Michel et al. | |
| 2013/0211698 A1 | 8/2013 | Lewis et al. | |

FOREIGN PATENT DOCUMENTS

WO    2013114298    8/2013

OTHER PUBLICATIONS

PCT/US2015/020319 International Search Report and Written Opinion, Nov. 25, 2015, 17 pages.

* cited by examiner

*Primary Examiner* — Hieu T Vo
(74) *Attorney, Agent, or Firm* — Taft Stettinius & Hollister LLP

(57) ABSTRACT

Apparatuses, methods, and systems for conditionally re-starting an internal combustion engine are disclosed. Certain exemplary embodiments evaluate information associated with a temperature of an accessory of an internal combustion engine and conditionally re-start the internal combustion engine after an engine shutdown based at least in part upon said information and a determination that a post-engine-shutdown temperature of the engine accessory would exceed a predetermined criterion. In certain embodiments the accessory includes a component of a turbocharger. In certain embodiments the accessory includes a component of an exhaust aftertreatment system.

29 Claims, 4 Drawing Sheets

INTERNAL COMBUSTION ENGINE START-STOP CONTROLS

BACKGROUND

The present application relates generally to start-stop controls for internal combustion engine systems and more particularly, but not exclusively to start-stop controls accounting for a temperature condition of one or more engine system components. Engine start-stop events can cause undesired degradation and damage to engine systems. For example, hot shutdown events may result in degradation or damage to a number of temperature sensitive engine system components, such as turbochargers and exhaust aftertreatment systems. Conventional approaches to engine start-stop controls seek to avoid hot shutdown events, for example, by idling the engine after high load operation. This results in significant lost opportunities for fuel savings. There remains a significant need for the apparatuses, methods and systems for engine start-stop control discussed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique method of controlling re-start of a vehicle engine based at least in part upon information associated with a temperature of an engine accessory and a post-engine-shutdown temperature of the engine accessory exceeding a predetermined criterion. Another embodiment is a unique method for determining whether to re-start an engine of a start-stop vehicle based on accessory temperature information. The accessory temperature information may account for a rate of temperature increase and may be determined based upon a thermal model of an accessory such as a turbocharger or one or more components thereof, or an exhaust aftertreatment system or one or more components thereof. Engine re-start may be based upon a prognostic indication that an accessory temperature will exceed a predetermined threshold within a specified post-engine-shutdown time period. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DETAILED DESCRIPTION OF ILLUSTRATIVE EMBODIMENTS

Figure 1:
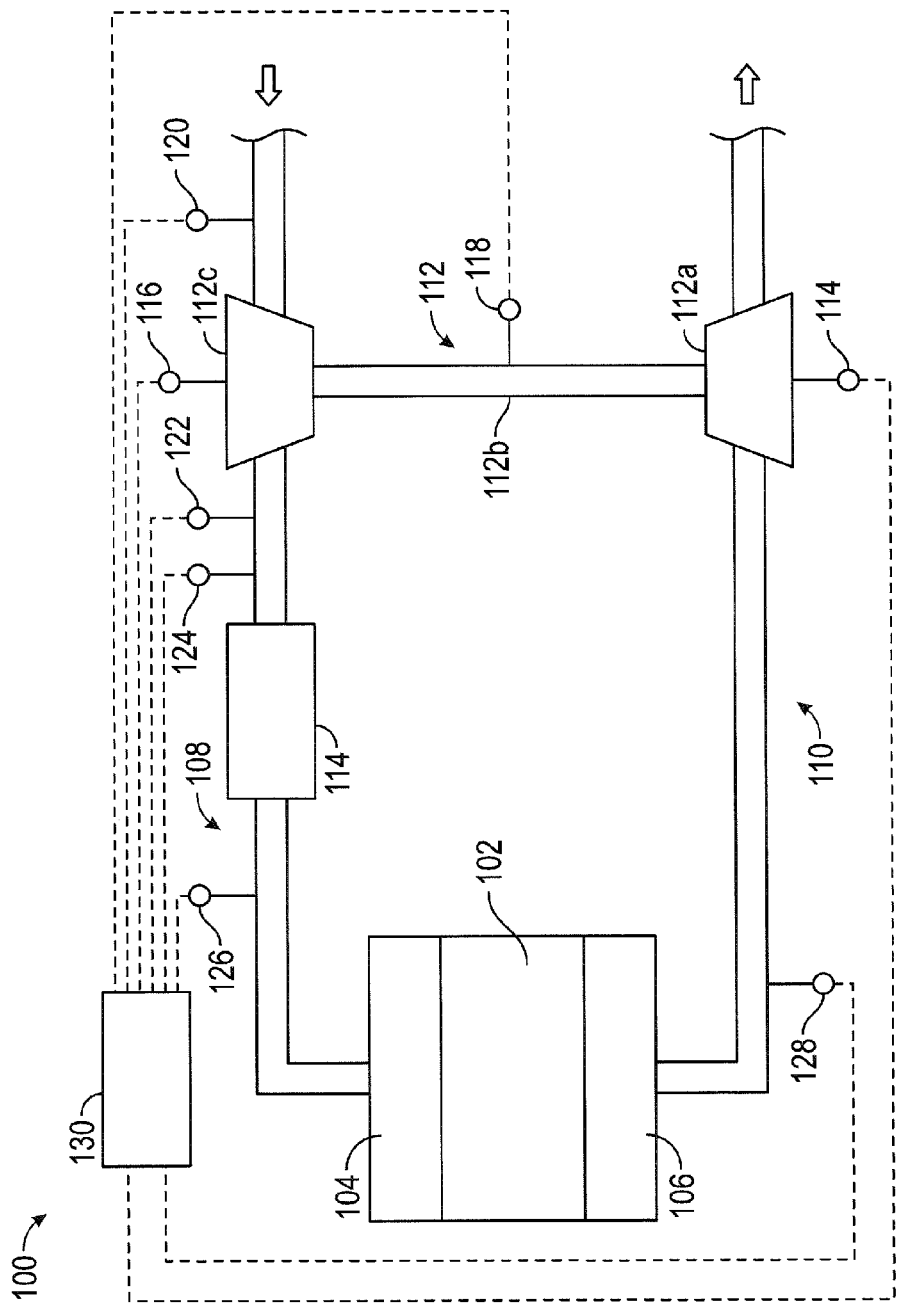
FIG. 1 illustrates a schematic view of an example internal combustion engine system.

With reference to FIG. 1 there is illustrated a schematic view of an example engine system 100 including an engine 102, such as an internal combustion engine, and a turbocharger 112. The engine 102 is in fluid communication with an intake system 108 through which charge air enters an intake manifold 104 of the engine 102 and an exhaust system 110 through which exhaust gas resulting from combustion exits by way of an exhaust manifold 106 of the engine 102, it being understood that not all details of these systems that are typically present are shown. The engine 102 includes a number of cylinders forming combustion chambers into which fuel is injected by fuel injectors to combust with the charge air that has entered through intake manifold 104. The energy released by combustion powers the engine 102 via pistons connected to a crankshaft. Intake valves control the admission of charge air into the cylinders, and exhaust valves control the outflow of exhaust gas through exhaust manifold 106 and ultimately to the atmosphere.

The turbocharger 112 is operable to compress ambient air before the ambient air enters the intake manifold 104 of the engine 102 at increased pressure. It is contemplated that in the engine system 100 including the turbocharger 112, the turbocharger 112 may include a variable geometry turbocharger (VGTs), fixed geometry turbocharger, twin-turbochargers, and/or series or parallel configurations of multiple turbochargers, as well as other turbocharger or supercharger systems, devices and configurations. The illustrated turbocharger 112 includes a bearing housing 112b for housing bearings and a shaft connecting a turbine 112a coupled to the exhaust system 110 with a compressor 112c coupled to the intake system 108. The air from the compressor 112c is pumped through the intake system 108, to the intake manifold 104, and into the cylinders of the engine 102, typically producing torque on the crankshaft.

The intake system 108 further includes a charge after cooler (CAC) 114 operable to cool the charge flow provided to the intake manifold 104. It is contemplated that in certain embodiments the CAC 114 may include charge air cooler bypass values, or that the CAC 114 may not be present altogether. The intake system 108 and/or the exhaust system 110 may further include various components not shown, such as coolers, valves, bypasses, an exhaust gas recirculation (EGR) system, intake throttle valves, exhaust throttle valves, EGR valves, and/or compressor bypass valves, for example.

The engine system 100 further includes a controller 130 structured to perform certain operations and to receive and interpret signals from any component and/or sensor of the engine system 100. It shall be appreciated that the controller 130 may be provided in a variety of forms and configurations including one or more computing devices forming a whole or a part of a processing subsystem having non-transitory memory storing computer executable instructions, processing, and communication hardware. The controller 130 may be a single device or a distributed device, and the functions of the controller 130 may be performed by hardware or software. The controller 130 is in communication with any actuators, sensors, datalinks, computing devices, wireless connections, or other devices to be able to perform any described operations.

The processing logic may be implemented as modules, which may be implemented in operating logic as operations by software, hardware, artificial intelligence, fuzzy logic, or any combination thereof, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or in part with other modules or devices. The operations of any module may be performed wholly or partially in hardware/software or by other modules.

The controller 130 includes stored data values, constants, and functions, as well as operating instructions stored on computer readable medium. Any of the operations of exemplary procedures described herein may be performed at least partially by the controller. Other groupings that execute similar overall operations are understood within the scope of the present application. More specific descriptions of certain embodiments of the controller 130 operations are discussed herein in connection with FIG. 2. Operations illustrated are understood to be exemplary only, and operations may be combined or divided, and added or removed, as well as re-ordered in whole or in part.

The engine system 100 includes a turbine housing temperature sensor 114, a compressor housing temperature sensor 116, and a bearing housing temperature sensor 118, each operable to provide a signal to the controller 130 indicating the temperature of each of the respective housings of the turbocharger 112. The engine system 100 additionally includes a mass air flow (MAF) sensor 120, an ambient air temperature sensor 122, an ambient air pressure sensor 124, and an intake pressure sensor 126, each in fluid communication with the intake system 108. The engine system 100 further includes an exhaust temperature sensor 128 in fluid communication with the exhaust system 110. The sensors described herein need not be in direct communication with the intake system 108 or the exhaust system 110 and can be located at any position within the intake system 108 or the exhaust system 110 that provides a suitable indication of applicable intake system 108 and exhaust system 110 readings.

It shall be appreciated that the foregoing sensors and sensor arrangements are but several non-limiting, illustrative embodiments of sensors and sensor systems to which the principles and techniques disclosed herein may be applied. A variety of other types of sensors and sensor configurations may be utilized including coolant temperature sensors, oil temperature sensors, EGR flow sensors, boost pressure sensors, and/or exhaust temperature sensors to name but a few examples. It shall further be appreciated that the sensors which are utilized may be physical sensors, virtual sensors, and/or combinations thereof.

The controller 130 is operatively coupled with and configured to store instructions in memory which are readable and executable by the controller 130 to provide the engine 102 with a command to re-start. Certain operations described herein include operations to interpret one or more parameters. Interpreting, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a runtime parameter by any means known in the art, and/or by receiving a value by which the interpreted parameter can be calculated, and/or by referencing a default value that is interpreted to be the parameter value.

Figure 2:
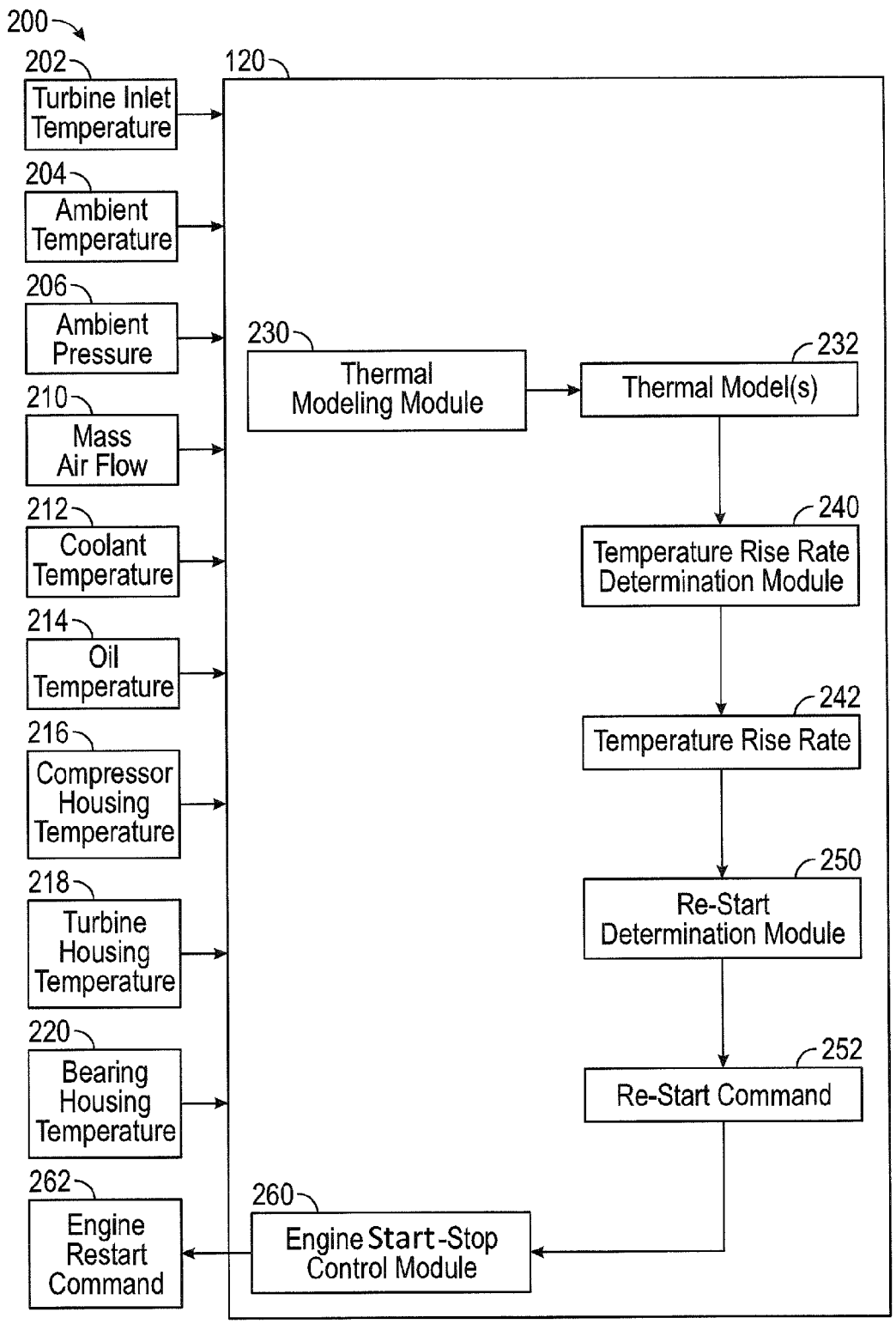
FIG. 2 illustrates a schematic block diagram of an example controller for an internal combustion engine system.

On example embodiment of controller 130 is shown in FIG. 2. The controller 130 includes a number of inputs representing received signals from various sensors associated with the engine system 100 described in FIG. 1. In the illustrated embodiment, the controller 130 includes a turbine inlet temperature input 202, an ambient temperature input 204, an ambient pressure input 206, a mass air flow input 208, a coolant temperature input 212, an oil temperature input 214, a compressor housing temperature 216, a turbine housing temperature 218, and a bearing housing temperature 220. In certain embodiments, additional inputs may be received at controller 130, such as an input corresponding to an exhaust aftertreatment system component temperature, for example, temperatures of oxidation catalysts, SCR catalysts, particulate filters including upstream temperatures, inlet temperatures, intra-bed temperatures including, outlet temperatures, and/or downstream temperatures.

In certain embodiments, the turbine inlet temperature input 202 may be received from the exhaust temperature sensor 128, the ambient temperature input 204 may be received from the ambient air temperature sensor 122, the ambient pressure input 206 may be received from the ambient air pressure sensor 124, and/or the mass air flow input may be received from the MAF sensor 120. In other embodiments, the compressor housing temperature 216 may be received from the compressor housing temperature sensor 116, the turbine housing temperature 218 may be received from the turbine housing temperature sensor 114, and/or the bearing housing temperature 220 may be received from the bearing housing temperature sensor 118.

The illustrated controller 130 includes a thermal modeling module 230, a temperature rise rate determination module 240, a re-start determination module 250, and an engine start-stop control module 260. Other controller 130 arrangements that functionally execute the operations of the controller 130 are contemplated in the present application.

The thermal modeling module 230 is structured to receive and interpret at least one of the inputs to the controller 130. In an example embodiment, the thermal conditioning module 230 is further structured to make thermal determinations or estimations based upon one or more thermal models 232 based at least in part on the inputs receive by the controller 130 and to provide one or more outputs based upon the thermal model(s) 232 to the temperature rise rate determination module 240. In certain non-limiting embodiments, the thermal model(s) 232 may include a turbocharger thermal model, an exhaust aftertreatment system thermal module, and/or a thermal model for any of a variety of other components of the engine system 100. The temperature rise rate determination module 240 is structured to receive and interpret the thermal model(s) 232 received from the thermal modeling module 230 and to determine a temperature rise rate 242 based on the thermal model(s) 232. The temperature rise rate determination module 240 is further structured to provide the temperature rise rate 242 to the re-start determination module 250.

The re-start determination module 250 is structured to receive and interpret the temperature rise rate 242 from the temperature rise rate determination module 240. The re-start determination module 250 is further structured to determine a re-start command 252 and to provide the re-start command 252 to the engine start-stop control module 260. The re-start command may take a variety of forms in various embodiments including, for example, a re-start time, a re-start instruction, a re-start request, and/or a re-start flag, among other forms. In certain embodiments, the re-start command may be based on an indication that a post-engine-shutdown temperature of the turbocharger 112 along the temperature rise rate 242 would exceed a temperature threshold within a specified post-engine-shutdown time period absent re-starting the engine 102. The engine start-stop control module 260 is structured to receive and interpret the re-start command 252 from the re-start determination module 250 and to provide an engine re-start command 262 to the engine 102 based on the re-start command 252.

Figure 3:
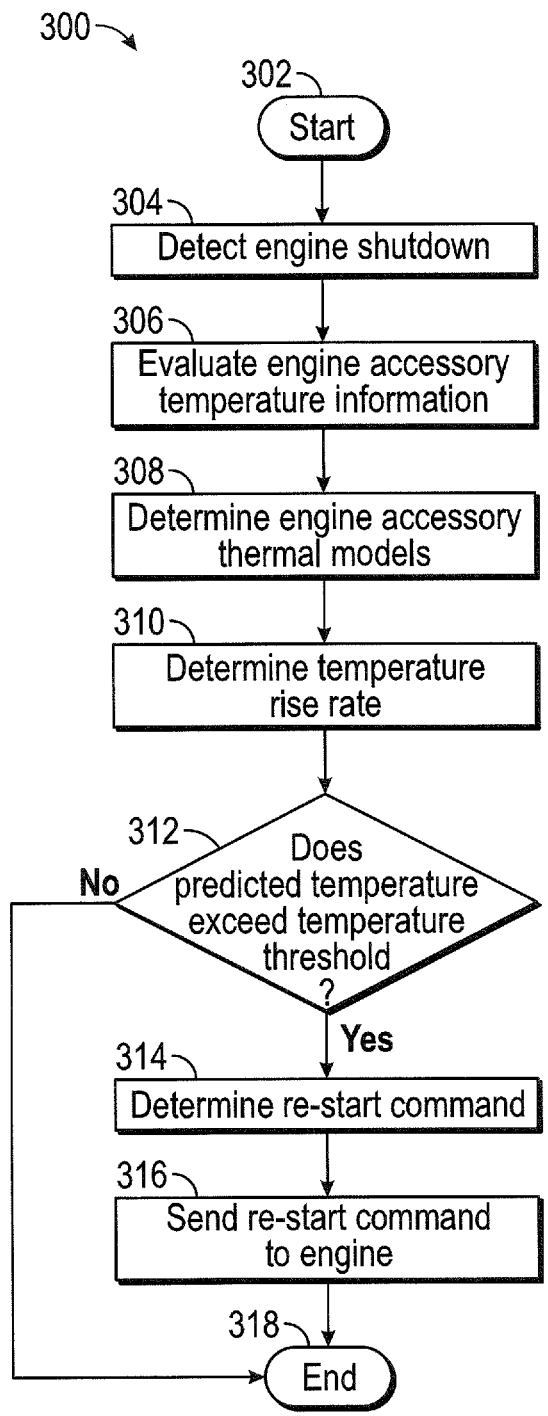
FIG. 3 illustrates a flow diagram of an example procedure for determining and providing re-start commands to an internal combustion engine system.

The schematic flow diagram in FIG. 3 and related description which follows provides an illustrative embodiment of performing procedures for controlling an engine re-start. Operations illustrated are understood to be exemplary only, and operations may be combined or divided, and added or removed, as well as re-ordered in whole or part. Certain operations illustrated may be implemented by a computer executing a computer program provided on a non-transitory computer readable storage medium, where the computer program comprises instructions causing the computer to execute one or more of the operations, or to issue commands to other devices to execute one or more of the operations.

With reference to FIG. 3, there is illustrated a flow diagram of an example procedure 300 for determining whether an re-start is required and providing a re-start command to the engine system 100 based on determining the re-start is required. Procedure 300 starts at operation 302, which may begin by interpreting a key-on event and/or by initiation by an operator or technician. Operation 302 may alternatively or additionally include interpreting a communication or other parameter indicating that another iteration of procedure 300 may restart upon completion of procedure 300.

Procedure 300 continues from operation 302 to operation 304 where an engine shutdown event of engine 102 is detected. From operation 304, procedure 300 continues to operation 306 to evaluate temperature information for one or more engine accessories of the engine system 100. In certain embodiments, operation 306 may evaluate temperature information for the turbocharger 112, an exhaust aftertreatment system component of the engine system 100, and/or any other engine accessory. Procedure 300 continues from operation 306 to operation 308 to determine one or more thermal models based on the engine accessories of the engine system 100 for which the temperature information was evaluated at operation 306. In certain embodiments, the thermal models may include a thermal model of an initial post-engine-shutdown condition, a heat flow condition, an ambient condition, a cooling flow condition, a heat soak condition, a thermal capacitance condition, and/or a heat transfer condition.

From operation 308, procedure 300 continues to operation 310 to determine a temperature rise rate based on the thermal models determined at operation 308. In certain embodiments, the temperature rise rate is based on an inlet temperature of the turbine 112a, an ambient temperature, a coolant temperature, an exhaust temperature, a mass flow rate, an oil rifle pressure, an oil temperature, and/or an exhaust aftertreatment system component temperature. Procedure 300 continues from operation 310 to conditional 312 to determine whether a predicted temperature, based on the rise rate, exceeds the temperature threshold within a specified post-engine-shutdown time period. In certain embodiments the duration of the time period is equal to the re-start cycle (i.e., the duration of time between the engine shutdown event and a normal re-start time, or resume cycle).

If the predicted temperature does not exceed the temperature threshold within the specified post-engine-shutdown time period, procedure 300 ends at operation 318. If the predicted temperature exceeds the temperature threshold within the specified post-engine-shutdown time period, procedure 300 continues to operation 314 to determine a re-start command. In certain embodiments, the re-start command may be a predetermined period of time before the temperature rise rate predicts that a temperature along the temperature rise rate will exceed the temperature threshold. From operation 314, procedure 300 continues to operation 316 to send a re-start command to the engine 102 before ending at operation 318. It shall be appreciated that procedure 300 is preferably repeated during to continuously evaluate operation conditions and predict temperature rises. Thus, procedure 300 may be called by another routine periodically or may proceed in a loop repeating after operation 318.

It shall be appreciated that a variety of prognostics techniques may be utilized to determine whether and when to re-start an engine based upon information associated with a temperature of one or more engine accessories or components thereof. Certain embodiments allow the engine to shutdown even after high temperature operation, maximizing the shutdown period before triggering a restart and reestablishing flows to carry heat away from the turbocharger. This could be accomplished in a variety of ways. Certain embodiments may utilize temperature measurements of one or more turbocharger components and intervening by restarting the engine based upon the temperature and/or rate of temperature rise of the component(s). Certain embodiments may utilize temperature measurements of one or more aftertreatment system components and intervening by restarting the engine based upon the temperature and/or rate of temperature rise of the component(s). Thermal modeling of one or more engine accessories or components thereof may be utilized to predict the component temperature rise (for example, in the case of a turbocharger, with turbine inlet temperature information, ambient temperature information, and/or coolant temperature information as inputs to the model) and intervening by restarting the engine based upon the modeled temperature and/or rise rate of the temperature. If the shutdown event is short enough or the initial temperatures are low enough, no intervention may be required.

Certain embodiments include modeling of thermal response of turbo to changing exhaust temps and mass flow rates in order to estimate initial conditions at shutdown. Certain embodiments include modeling of thermal response of turbo to initial conditions, ceased heat flows and ambient conditions at engine shutdown. Certain embodiments include modeling of thermal response of turbo to the reestablishment of cooling flows for given hot soak conditions. Certain embodiments may utilize physics-based models. Certain embodiments may utilize modeling of convective and radiative heat transfer to environment and of convective heat transfer to trapped gas, oil, and/or coolant in a turbocharger. Certain embodiments may utilize modeling of thermal capacitance of turbo components (mainly bearing, compressor and turbine housings). Certain embodiments may utilize virtual sensor(s) and/or a quasi-steady model. Certain embodiments may utilize a table based model calibrated through experimental data. In certain embodiments a controller may monitor a set of characteristic signals, e.g., turbine inlet temperature or any of the other temperature information disclosed herein. The signals may be determined through a virtual sensor or model and can be recorded during a moving window of time (e.g., a 30 second rolling window or another time period determined by the gas dynamics and/or thermodynamics of the system). The foregoing and other techniques may be implemented in the systems and processes described herein as well as a variety of additional or alternate systems and methods.

Figure 4A:
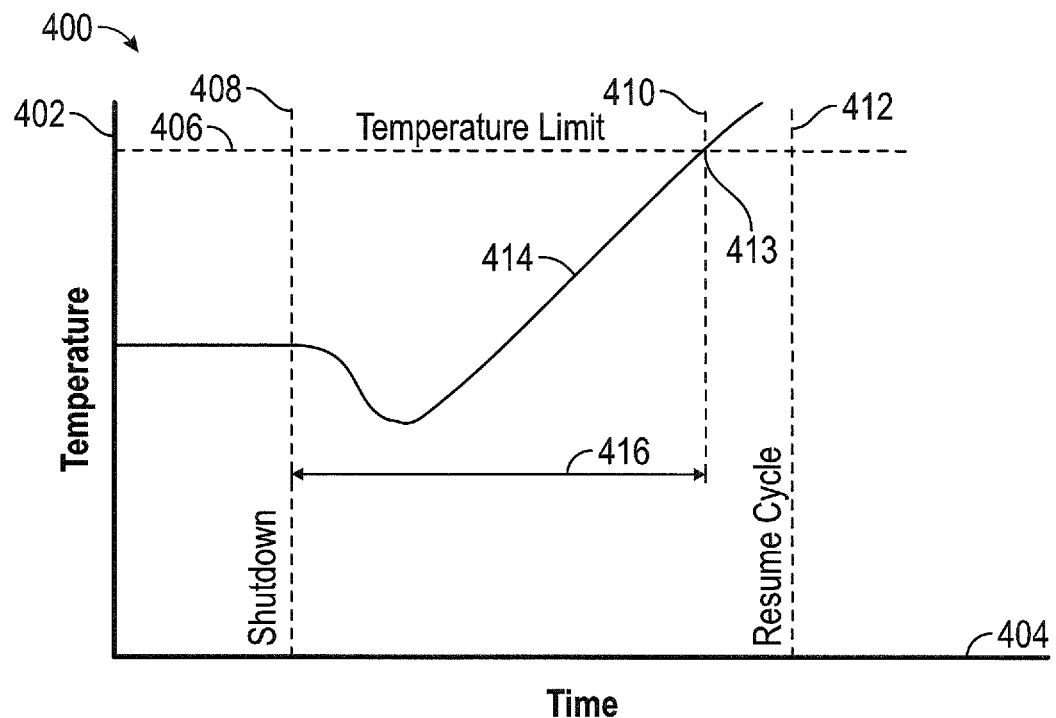
FIG. 4A is a graph illustrating an indication of a post-engine-shutdown temperature exceeding a threshold temperature.
Figure 4B:
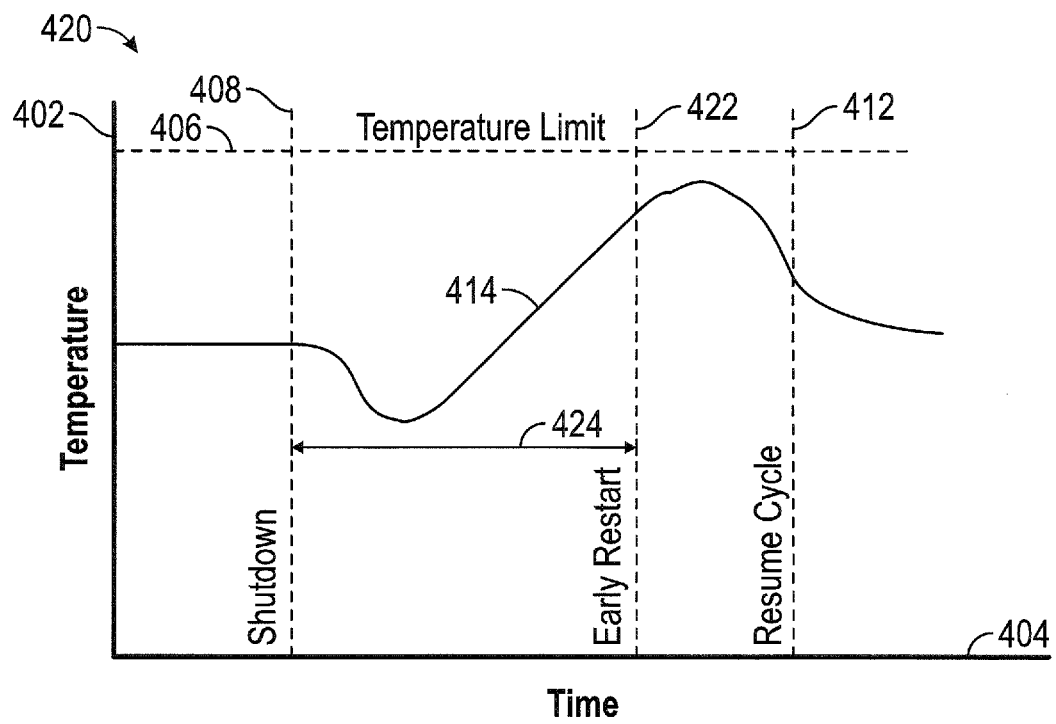
FIG. 4B is a graph illustrating the results of re-starting an engine based on the indication of FIG. 4A.

With reference to FIG. 4A, there is a line chart 400 illustrating a temperature rise rate of an engine accessory exceeding a temperature threshold within a specified post-engine-shutdown time period. The line chart includes a temperature along an y-axis 402 and a time along an x-axis 404. Line chart 400 additionally includes a temperature threshold 406, an engine shutdown event 408, and a normal re-start event 412. Line chart 400 further includes a re-start condition 418 where a predicted temperature rise rate 414 exceeds the temperature threshold 406 within a specified post-engine-shutdown time period (i.e., between the engine shutdown event 408 and the normal restart event 412). In certain embodiments, the specified post-engine-shutdown time period may be a rolling time window. Additionally, line chart 400 includes a re-start condition marker 410 providing a visual indication of the point at which the predicted temperature rise rate 414 exceeds the temperature threshold 406. The time between the engine shutdown event 408 and the re-start condition marker 410 indicate a re-start command duration 416 over which a re-start command may be established to provide an engine re-start command to the engine 102.

With reference to 4B, there is a line chart 420 illustrating a re-start of the engine 102 prior to the temperature of the engine accessory exceeding a temperature threshold within the specified post-engine-shutdown time period. The line chart includes the temperature along the y-axis 402 and the time along the x-axis 404. Line chart 420 additionally includes the temperature threshold 406, the engine shutdown event 408, the normal re-start event 412, and the predicted temperature rise rate 414. Line chart 420 further includes a re-start command marker 422 providing a visual indication of an executed re-start command duration 416 (i.e., the point at which the engine 102 was restarted after the engine shutdown event 408).

Various aspects of the systems, apparatus, and methods are disclosed herein. For example, one aspect involves a system that includes an internal combustion engine, a turbocharger operatively coupled with the internal combustion engine, and a controller operatively coupled with the internal combustion engine. The controller is structured to evaluate information associated with a temperature of the turbocharger and conditionally re-start the internal combustion engine after an engine shutdown based at least in part upon said information. The controller evaluates whether to conditionally re-start the internal combustion engine based at least in part upon an indication that a post-engine-shutdown temperature of the turbocharger would exceed a predetermined criterion absent re-starting the internal combustion engine.

In one embodiment, the controller is further structured to conditionally disable shutdown of the internal combustion engine based at least in part upon an evaluation that the information associated with the temperature of the turbocharger meets a second predetermined criterion. In another embodiment, the second predetermined criterion comprises the temperature of the turbocharger exceeding a threshold value within a specified post-engine-shutdown time period. In still another embodiment, the indication that the post-engine-shutdown temperature of the turbocharger would meet the predetermined criterion absent re-starting the internal combustion engine is based at least in part upon a controller-based thermal model of at least one component of the turbocharger during a heat soak event after shutdown of the internal combustion engine. In yet another embodiment, the at least one component of the turbocharger includes at least one of a bearing, a seal, a bearing housing, a compressor housing, and a turbine housing. In still yet another embodiment, the indication that the post-engine-shutdown temperature of the turbocharger would meet the predetermined criterion is based at least in part on a magnitude and a rate of change of the information associated with a temperature of the turbocharger.

Another aspect involves a method that includes operating a system including an internal combustion engine, a turbocharger operatively coupled with the internal combustion engine, and a controller, receiving, with the controller, information associated with a temperature of the turbocharger after shutdown of the internal combustion engine. evaluating, with the controller, the information associated with the temperature of the turbocharger relative to a predetermined temperature criterion, determining, with the controller, a re-start command based on a relationship between the information associated with the temperature of the turbocharger and the temperature criterion, and re-starting the internal combustion engine based on the re-start command.

In one embodiment, the information associated with the temperature of the turbocharger includes a temperature of at least one of a bearing of the turbocharger, a seal of the turbocharger, a bearing housing of the turbocharger, a compressor housing of the turbocharger, and a turbine housing of the turbocharger. In another embodiment, the information associated with the temperature of the turbocharger includes a temperature based upon a computer model of at least one component of the turbocharger. In still another embodiment, the information associated with the temperature of the turbocharger comprises a rate of temperature change post-engine-shutdown. In yet another embodiment, the rate of temperature change is based on a thermal model accounting for at least one of an initial post-engine-shutdown condition, a heat flow condition, an ambient condition, a cooling flow condition, a heat soak condition, a thermal capacitance condition, and a heat transfer condition. In still yet another embodiment, the thermal model further accounts for at least one of an inlet temperature of the turbine, an ambient temperature, a coolant temperature, an exhaust temperature, a mass flow rate, an oil rifle pressure, an oil temperature, and an exhaust aftertreatment system component temperature. In yet still another embodiment, the determining an re-start command is based upon a determination that the temperature of the turbocharger will exceed a threshold at a future point in time. In another embodiment, the determination that the temperature of the turbocharger will exceed a threshold at a future point in time is based upon a rolling window of the temperature of the turbocharger.

Still another aspect involves a method that includes operating a controller operatively coupled with an internal combustion engine to shut down the internal combustion engine, operating the controller to evaluate information associated with a temperature of an engine accessory operatively coupled with the internal combustion engine after shutdown of the internal combustion engine, and operating the controller to command the internal combustion engine to re-start based upon a determination that the temperature of the accessory will exceed a predetermined criterion absent re-starting the internal combustion engine.

In one embodiment, the determination that the temperature of the accessory will exceed the predetermined criterion is based at least in part upon a thermal model of the engine accessory. In another embodiment, the thermal model of the engine accessory accounts for at least one of an inlet temperature of a turbine, an ambient temperature, a coolant temperature, an exhaust temperature, a mass flow rate, an oil rifle pressure, an oil temperature, and an exhaust aftertreatment component temperature. In still another embodiment, the engine accessory includes a turbocharger and the method further further includes determining an estimated shutdown initial condition based on a first modeled thermal response of the turbocharger in response to at least one of a changing exhaust temperature and a changing mass flow rate. The thermal model of the turbocharger is based on the first modeled thermal response.

In yet another embodiment, the method further includes determining a second modeled thermal response of the turbocharger in response to at least one of the estimated shutdown initial condition, a ceased heat flow, a heat soak condition, and an ambient condition. The thermal model of the turbocharger is further based on the second modeled thermal response. In yet still another embodiment, the method further includes determining a third modeled thermal response of the turbocharger in response to a re-establishment of cooling flows for the heat soak condition. The thermal model of the turbocharger is further based on the third modeled thermal response. In still yet another embodiment, the determination that the temperature of the accessory will exceed a predetermined criterion absent re-starting the internal combustion engine is based upon determining a thermal capacitance of the engine accessory. In another embodiment, operating the controller to command the internal combustion engine to re-start based upon the determination occurs independently of an operator input to the controller indicating that the internal combustion engine should re-start.

Yet another aspect involves a system that includes an internal combustion engine, an engine accessory operatively coupled with the internal combustion engine, and a controller operatively coupled with the internal combustion engine. The controller is structured to evaluate information associated with a temperature of the engine accessory and conditionally re-start the internal combustion engine after an engine shutdown based at least in part upon said information. The controller evaluates whether to conditionally re-start the internal combustion engine based at least in part upon a post-engine-shutdown temperature of the engine accessory meeting a first predetermined condition.

In one embodiment, the controller is further structured to conditionally disable shutdown of the internal combustion engine based at least in part upon an evaluation that the information associated with the temperature of the engine accessory meets a second predetermined criterion. In another embodiment, the first predetermined condition comprises a rate of change of temperature of the engine accessory, and the second predetermined condition comprises the temperature of the engine accessory exceeding a threshold value. In still another embodiment, the first predetermined condition is based at least in part upon a controller-based thermodynamic model of at least one component of the engine accessory during a heat soak event after shutdown of the internal combustion engine. In yet another embodiment, the at engine accessory comprises a turbocharger. In still yet another embodiment, the at engine accessory comprises at least one component of an exhaust aftertreatment system. In yet still another embodiment, the controller is structured to evaluate the information relative to at least one predetermined criterion over a rolling time window.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine;
a turbocharger operatively coupled with the internal combustion engine; and
a controller operatively coupled with the internal combustion engine,
wherein the controller is structured to evaluate information associated with a temperature of the turbocharger and conditionally re-start the internal combustion engine after an engine shutdown based at least in part upon said information, and
wherein the controller evaluates whether to conditionally re-start the internal combustion engine based at least in part upon an indication that a post-engine-shutdown temperature of the turbocharger would exceed a predetermined criterion absent re-starting the internal combustion engine.

2. The system of claim 1, wherein the controller is further structured to conditionally disable shutdown of the internal combustion engine based at least in part upon an evaluation that the information associated with the temperature of the turbocharger meets a second predetermined criterion.

3. The system of claim 2, wherein the second predetermined criterion comprises the temperature of the turbocharger exceeding a threshold value within a specified post-engine-shutdown time period.

4. The system of claim 1, wherein the indication that the post-engine-shutdown temperature of the turbocharger would meet the predetermined criterion absent re-starting the internal combustion engine is based at least in part upon a controller-based thermal model of at least one component of the turbocharger during a heat soak event after shutdown of the internal combustion engine.

5. The system of claim 4, wherein the at least one component of the turbocharger includes at least one of a bearing, a seal, a bearing housing, a compressor housing, and a turbine housing.

6. The system of claim 1, wherein the indication that the post-engine-shutdown temperature of the turbocharger would meet the predetermined criterion is based at least in part on a magnitude and a rate of change of the information associated with the temperature of the turbocharger.

7. A method, comprising:
   operating a system including an internal combustion engine, a turbocharger operatively coupled with the internal combustion engine, and a controller;
   receiving, with the controller, information associated with a temperature of the turbocharger after shutdown of the internal combustion engine;
   evaluating, with the controller, the information associated with the temperature of the turbocharger relative to a predetermined temperature criterion;
   determining, with the controller, a re-start command based on a relationship between the information associated with the temperature of the turbocharger and the temperature criterion; and
   re-starting the internal combustion engine based on the re-start command.

8. The method of claim 7, wherein the information associated with the temperature of the turbocharger includes a temperature of at least one of a bearing of the turbocharger, a seal of the turbocharger, a bearing housing of the turbocharger, a compressor housing of the turbocharger, and a turbine housing of the turbocharger.

9. The method of claim 7, wherein the information associated with the temperature of the turbocharger includes a temperature based upon a computer model of at least one component of the turbocharger.

10. The method of claim 7, wherein the information associated with the temperature of the turbocharger comprises a rate of temperature change post-engine-shutdown.

11. The method of claim 10, wherein the rate of temperature change is based on a thermal model accounting for at least one of an initial post-engine-shutdown condition, a heat flow condition, an ambient condition, a cooling flow condition, a heat soak condition, a thermal capacitance condition, and a heat transfer condition.

12. The method of claim 11, wherein the thermal model further accounts for at least one of an inlet temperature of the turbine, an ambient temperature, a coolant temperature, an exhaust temperature, a mass flow rate, an oil rifle pressure, an oil temperature, and an exhaust aftertreatment system component temperature.

13. The method of claim 10, wherein the determining a re-start command is based upon a determination that the temperature of the turbocharger will exceed a threshold at a future point in time.

14. The method of claim 13, wherein the determination that the temperature of the turbocharger will exceed the threshold at the future point in time is based upon a rolling window of the temperature of the turbocharger.

15. A method, comprising:
   operating a controller operatively coupled with an internal combustion engine to shut down the internal combustion engine;
   operating the controller to evaluate information associated with a temperature of an engine accessory operatively coupled with the internal combustion engine after shutdown of the internal combustion engine; and
   operating the controller to command the internal combustion engine to re-start based upon a determination that the temperature of the accessory will exceed a predetermined criterion absent re-starting the internal combustion engine.

16. The method of claim 15, wherein the determination that the temperature of the accessory will exceed the predetermined criterion is based at least in part upon a thermal model of the engine accessory.

17. The method of claim 16, wherein the thermal model of the engine accessory accounts for at least one of an inlet temperature of a turbine, an ambient temperature, a coolant temperature, an exhaust temperature, a mass flow rate, an oil rifle pressure, an oil temperature, and an exhaust aftertreatment component temperature.

18. The method of claim 15, wherein the engine accessory comprises a turbocharger, the method further comprising:
   determining an estimated shutdown initial condition based on a first modeled thermal response of the turbocharger in response to at least one of a changing exhaust temperature and a changing mass flow rate,
   wherein the thermal model of the turbocharger is based on the first modeled thermal response.

19. The method of claim 18, further comprising:
   determining a second modeled thermal response of the turbocharger in response to at least one of the estimated shutdown initial condition, a ceased heat flow, a heat soak condition, and an ambient condition,
   wherein the thermal model of the turbocharger is further based on the second modeled thermal response.

20. The method of claim 19, further comprising:
   determining a third modeled thermal response of the turbocharger in response to a re-establishment of cooling flows for the heat soak condition,
   wherein the thermal model of the turbocharger is further based on the third modeled thermal response.

21. The method of claim 15, wherein the determination that the temperature of the accessory will exceed the predetermined criterion absent re-starting the internal combustion engine is based upon determining a thermal capacitance of the engine accessory.

22. The method of claim 15, wherein operating the controller to command the internal combustion engine to re-start based upon the determination occurs independently of an operator input to the controller indicating that the internal combustion engine should re-start.

23. A system, comprising:
   an internal combustion engine;
   an engine accessory operatively coupled with the internal combustion engine; and
   a controller operatively coupled with the internal combustion engine,
   wherein the controller is structured to evaluate information associated with a temperature of the engine accessory and conditionally re-start the internal combustion engine after an engine shutdown based at least in part upon said information, and
   wherein the controller evaluates whether to conditionally re-start the internal combustion engine based at least in part upon a post-engine-shutdown temperature of the engine accessory meeting a first predetermined condition.

24. The system of claim 23, wherein the controller is further structured to conditionally disable shutdown of the internal combustion engine based at least in part upon an evaluation that the information associated with the temperature of the engine accessory meets a second predetermined condition.

25. The system of claim 24, wherein the first predetermined condition comprises a rate of change of temperature of the engine accessory, and the second predetermined condition comprises the temperature of the engine accessory exceeding a threshold value.

26. The system of claim 23, wherein the first predetermined condition is based at least in part upon a controller-based thermodynamic model of at least one component of the engine accessory during a heat soak event after shutdown of the internal combustion engine.

27. The system of claim 26, wherein the engine accessory comprises a turbocharger.

28. The system of claim 26, wherein the engine accessory comprises at least one component of an exhaust aftertreatment system.

29. The system of claim 23, wherein the controller is structured to evaluate the information relative to at least one predetermined criterion over a rolling time window.

\* \* \* \* \*